US011870605B2

(12) United States Patent
Nalagatla et al.

(10) Patent No.: US 11,870,605 B2
(45) Date of Patent: Jan. 9, 2024

(54) EVPN TENANT DOMAIN TRANSIT NETWORK FOR MULTICAST TRAFFIC

(71) Applicant: Arista Networks, Inc., Santa Clara, CA (US)

(72) Inventors: Suresh Nalagatla, Fremont, CA (US); Saravanan Balasubramanian, Belmont, CA (US); Prashant Srinivas, San Jose, CA (US); Bharathram Pattabhiraman, San Jose, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/840,599

(22) Filed: Jun. 14, 2022

(65) Prior Publication Data

US 2022/0417059 A1  Dec. 29, 2022

Related U.S. Application Data

(60) Provisional application No. 63/216,516, filed on Jun. 29, 2021.

(51) Int. Cl.
*H04L 12/44* (2006.01)
*H04L 12/46* (2006.01)
*H04L 12/18* (2006.01)

(52) U.S. Cl.
CPC ...... *H04L 12/4641* (2013.01); *H04L 12/1886* (2013.01); *H04L 12/44* (2013.01); *H04L 12/462* (2013.01)

(58) Field of Classification Search
CPC .................. H04L 12/4641; H04L 12/1886
USPC .......................................................... 709/225
See application file for complete search history.

(56) References Cited

U.S. PATENT DOCUMENTS

| 9,019,981 | B1 | 4/2015 | Weinstein et al. |
| 10,116,464 | B2 | 10/2018 | Lin et al. |
| 2017/0085424 | A1 | 3/2017 | Jha et al. |
| 2018/0367451 | A1 | 12/2018 | Gulrajani et al. |
| 2020/0177402 | A1* | 6/2020 | Mishra .................... H04L 45/16 |
| 2021/0036952 | A1 | 2/2021 | Pattabhiraman et al. |
| 2021/0328794 | A1* | 10/2021 | Mishra ................... H04L 63/105 |

* cited by examiner

*Primary Examiner* — Sibte H Bukhari
(74) *Attorney, Agent, or Firm* — Fountainhead Law Group PC

(57) ABSTRACT

Techniques for operating a network device are provided. In some embodiments, a method may comprise: forwarding multicast data packets from a source in a first customer network to a receiver in a second customer network; detecting that another PE device is forwarding the multicast data packets, wherein: Protocol Independent Multicast (PIM) is enabled on supplemental bridge domain (SBD) logical interfaces of the PE device and the another PE device, the PE device and the another PE device are PIM neighbors, and the PE device and the another PE device communicate with each other and with the receiver using the PIM protocol through an Ethernet virtual private network (EVPN). The method may further comprise: determining the another PE device is an assert winner from among the PE device and the another PE device based on at least one PIM assert message, the another PE device forwarding the multicast data packets.

17 Claims, 9 Drawing Sheets

500A-1

| FIELD | DESCRIPTION |
|---|---|
| Type | Message type. Value is 0. |
| Reserved | Reserved. The field is set to 0 when the message is sent and is ignored when the message is received. |
| Checksum | Checksum |
| Option Type | OPTION TYPE |
| Option Length | Length of the Option Value field |
| Option Value | OPTION VALUE |

500A-2

| OPTION TYPE | OPTION VALUE |
|---|---|
| 1 | Holdtime: timeout period during which a neighbor remains in the reachable state. If a router does not receive any Hello message during the timeout period, the router considers its neighbor unreachable. |
| 2 | The field consists of the following parts:<br>LAN Prune Delay: delay before transmitting Prune messages on a shared network segment<br>Interval: interval for overriding a Prune message<br>T: capability of suppressing Join messages |
| 19 | DR Priority: priority of a router interface, used to elect a designated router (DR). The higher a router interface's priority, the higher the probability the router interface becomes a DR. |
| 20 | Generation ID: a random number, indicating neighbor status. If the neighbor status changes, the random number is updated. When a router detects that the Hello messages received from an upstream device contain different Generation ID values, the router considers the upstream neighbor Down or the status of the upstream neighbor has changed. |
| 21 | State Refresh Capable: interval for refreshing neighbor status. |
| 24 | Address List: secondary address list of PIM interfaces |

| FIELD | DESCRIPTION |
|---|---|
| Type | Message type. Value is 3. |
| Upstream Neighbor Address | Upstream neighbor's address; the address of the downstream interface that receives the Join/Prune message and performs the Join or Prune action |
| Number of Groups | Number of groups contained in the message |
| Holdtime | Duration (in seconds) that an interface remains in the Join or Prune state |
| Group Address | Group address |
| Number of Joined Sources | Number of sources that the router joins |
| Number of Pruned Sources | Number of sources that the router prunes |
| Joined Source Address | Address of the source that the router joins |
| Pruned Source Address | Address of the source that the router prunes |

| FIELD | DESCRIPTION |
|---|---|
| Type | Message type. Value is 5. |
| Group Address | Group address |
| Source Address | This field is a multicast source address if a unique forwarder is elected for (S, G) entries, and this field is 0 if a unique forwarder is elected for (*, G) entries. |
| R | RPT bit: This field is 0 if a unique forwarder is elected for (S, G) entries, and this field is 1 if a unique forwarder is elected for (*, G) entries. |
| Metric Preference | Priority of the unicast path to the source address; if the R field is 1, this field indicates the priority of the unicast path to the RP. |
| Metric | Cost of the unicast route to the source address; if the R field is 1, this field indicates the cost of the unicast path to the RP. |

FIG. 5C

EVPN TENANT DOMAIN TRANSIT NETWORK FOR MULTICAST TRAFFIC

CROSS-REFERENCE TO RELATED APPLICATIONS

This application claims the benefit of U.S. Provisional Application No. 63/216,516, filed Jun. 29, 2021.

BACKGROUND

Multicasting is used to distribute data (e.g., audio/visual data streams and real-time stock market data) identically from a source to multiple recipients. Multicast protocols allow a source to send a single copy of data to a multicast address (group), which is then distributed to an entire group of recipients. A multicast group identifies a set of recipients that are interested in a particular data stream. Data is addressed to the group and forwarded to all members of the multicast group. Such packets are referred to as multicast packets, where the packets target the multicast group.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5A illustrates a PIM hello message according to some embodiments.

FIG. 5B illustrates a PIM join message according to various embodiments.

FIG. 5C illustrates a PIM assert message in accordance with some embodiments.

DETAILED DESCRIPTION

Overview

The present disclosure describes systems and techniques for operating an Ethernet virtual private network (EVPN) tenant domain as a transit network for multicast traffic. Multiple provider edge routers may be coupled to a multicast source in a network. These provider edge routers may send the same multicast traffic from the source to a receiver in another network. This redundant traffic may waste network bandwidth.

Separate networks, which communicate over an EVPN in a provider core network, may each support multicast using protocol independent multicast (PIM). However, PIM is generally not supported between provider edge routers in the provider core network. PIM may be enabled on a supplemental bridge domain (SBD) logical interface in the PE routers and a virtual routing and forwarding (VRF) domain may be uniquely mapped to the SBD. Using this configuration, PIM may be used among the PE routers in the EVPN. The PE routers may be configured as PIM neighbors. The PE routers may also join sources in external networks.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1:
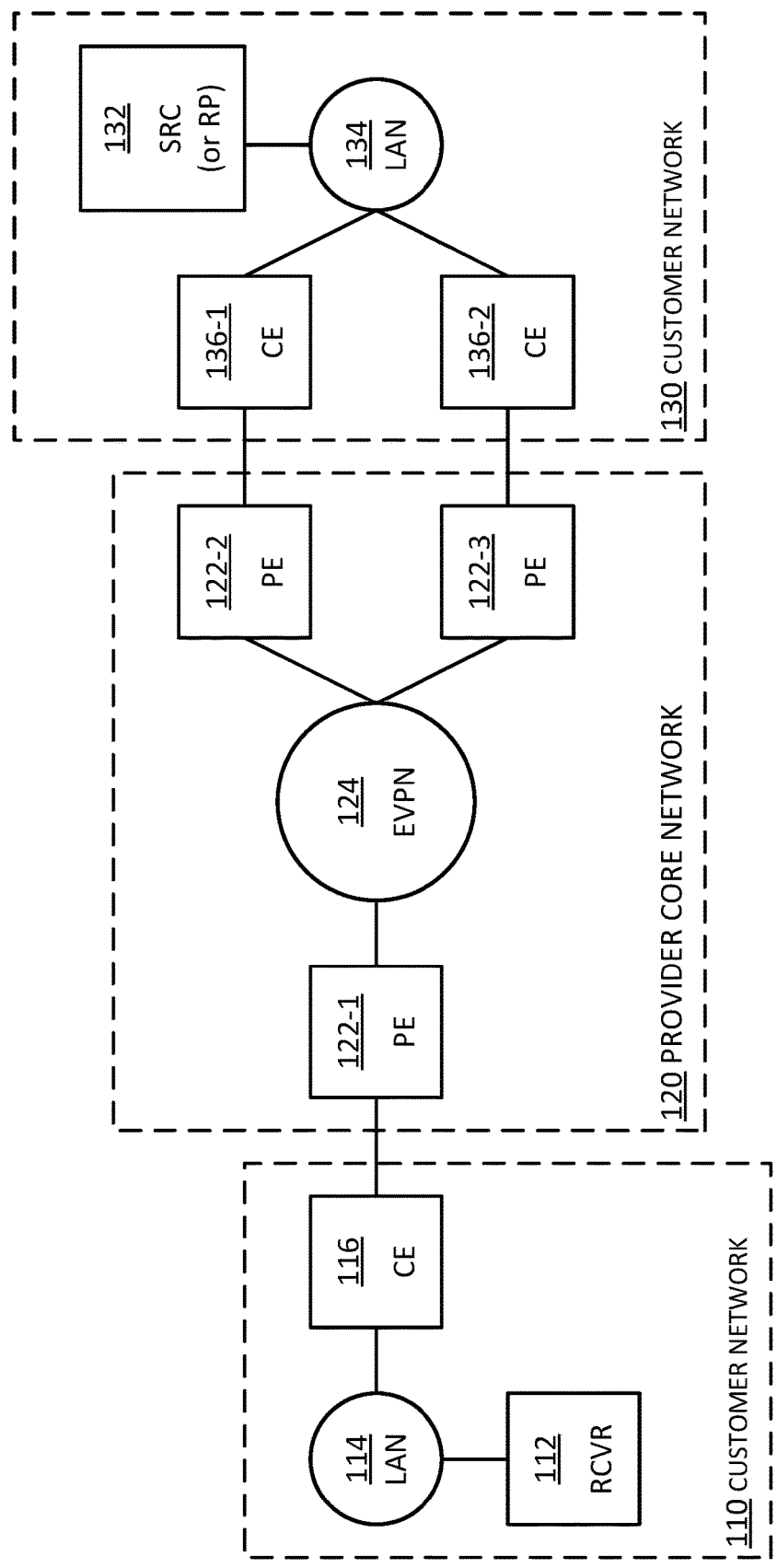
FIG. 1 illustrates simplified multicast network according to some embodiments.

FIG. 1 illustrates example multicast network 100 according to some embodiments. Multicast network 100 may be a tenant domain. In a multi-tenant cloud (not shown in FIG. 1), multiple organizations may share computing resources. Each organization uses a separate tenant domain and each tenant domain's data is isolated from and remains invisible to the other tenants.

Multicast network 100 may be used to distribute data (e.g., audio/visual (AV) data streams, real-time stock market data, and the like) from a source host to one or more receiver hosts. For example, multicast network 100 may deliver data packets from source host (source) 132 to receiver host (receiver) 112. Broadcast network 100 may include customer networks 110 and 130, and core network 120. Customer network 110 may include receiver 112, local area network (LAN) 114, and customer edge (CE) device 116. Core network 120 may include provider edge (PE) devices 122_1 through 122_3, and EVPN 124. Customer network 130 may include source 132, LAN 134, and CE devices 136_1 and 136_2.

Customer networks 110 and 130 may be computer networks on a premises, such as a residence, school, laboratory, office building, and/or campus. Receiver 112 may receive multicast data (e.g., multicast packets) from source 132. Receiver 112 may be a media output device. For example, receiver 112 may be a smart phone, tablet computer, notebook computer, desktop computer, (smart) television, smart speaker, and the like. When source (or rendezvous point (RP)) 132 is a source, source 132 may be a media input source, streaming device, and the like. By way of non-limiting example, source 132 may be various combinations and permutations of a microphone, video camera, server provisioning (pre-recorded or real-time) AV media or other data, and the like. When source (or rendezvous point (RP)) 132 is an RP, RP 132 may be a switch, router, and the like. Although one of receiver 112 and source (or RP) 132 are shown in FIG. 1, any number of receiver 112 and source (or RP) 132 may be used.

LANs 114 and 134 may be computer networks that interconnect computer systems (e.g., receiver 112 and source 132) within their respective premises. Computer systems are described further in FIG. 6. LANs 114 and 134 may deliver packets from a source host to a destination host based on an address in a data packet header (e.g., Internet Protocol (IP) address). LANs 114 and 134 may include wired and/or wireless networks, such as Ethernet and Wi-Fi networks.

LANs 114 and 134 may use a multicast routing protocol, such as Protocol Independent Multicast (PIM), to provide one-to-many (and/or many-to-many) distribution of data packets within and between LANs 114 and 134. When LANs 114 and 134 use PIM, they may be referred to as PIM domains. PIM may operate in several modes, such as bidirectional mode, sparse mode, dense mode, and sparse-dense mode. As will be described further below, in sparse-dense mode, some multicast groups are configured as dense mode (flood-and-prune, (S, G) state) and others are configured as sparse mode (explicit join to rendezvous point (RP), (*, G) state).

Within customer network 110, receiver 112 and CE device 116 may determine their interconnectivity by sending PIM hello messages. PIM hello message may be used for neighbor discovery and neighbor keepalives. FIG. 5A depicts example PIM hello message fields 500A-1 according to various embodiments. Option Types and Option Values 500A-2 may be examples for Option Types and Option Values in example PIM hello message fields 500A-1. For example, receiver 112 and CE device 116 may become neighbors when they receive each other's PIM hello messages. Within customer network 130, source 132 and CE devices 136_1 and 136_2 may become neighbors since they receive each other's PIM hello messages.

CE devices 116, 136_1, and 136_2 may be CE routers. CE devices 116, 136_1, and 136_2 may provide an interface (e.g., Ethernet) between LANs 114 and 134, and core network 120. CE devices 116, 136_1, and 136_2 may be located on their respective premises. CE devices 116, 136_1, and 136_2 may forward data packets using an address, such as an IP address. As shown, CE devices 136_1 and 136_2 may be connected to source 132.

Core network 120 may be a network provisioned and/or administered by a service provider. A service provider may be an organization that provides services for accessing, using, or participating in a wide area network (WAN) and/or the Internet. Core network 120 may connect customer networks 110 and 130 to each other. PE devices 122_1 through 122_3 may be PE routers that provide layer 2 virtual bridge connectivity between customer networks 110 and 130. PE devices 122_1 through 122_3 may be connected to CE devices 116, 136_1, and 136_2, respectively. PE devices 122_1 through 122_3 may communicate with each other through EVPN 124. PE devices 122_1 through 122_3 are described further in FIG. 7.

Ethernet virtual private network (EVPN) 124 may carry layer 2 Ethernet traffic as a virtual private network using WAN protocols. EVPN 124 may use Border Gateway Protocol (BGP) control plane infrastructure.

Establishing Multicast Distribution Trees

Figure 2:
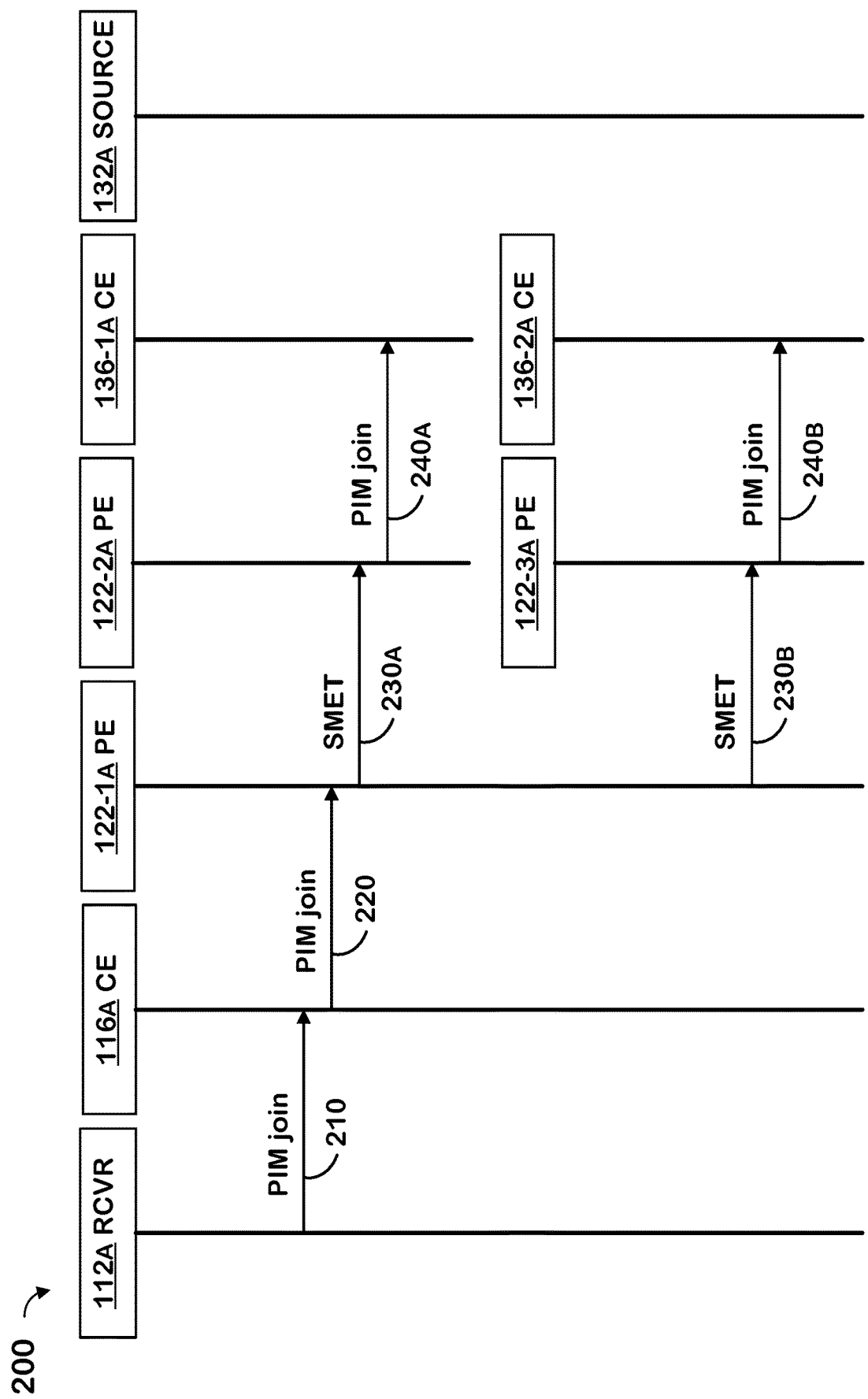
FIG. 2 illustrates a communication flow diagram according to various embodiments.

FIG. 2 depicts communication flow diagram 200 for building a multicast distribution tree, according to various embodiments. The topology may include receiver 112A, CE device 116A, PE device 122_1A, PE devices 122_2A and 122_3A, CE devices 136_1A and 136_2A, and source 132A. Receiver 112A, CE device 116A, PE device 122_1A, PE devices 122_2A and 122_3A, CE devices 136_1A and 136_2A, and source 132A may have at least some of the characteristics of receiver 112, CE device 116, PE device 122_1, PE devices 122_2 and 122_3, CE devices 136_1 and 136_2, and source (or RP) 132 of FIG. 1, respectively.

Consider receiver 112A requesting multicast traffic/packets from source (or RP) 132A. Referring to FIG. 1, data traffic from source 132A may go through CE device 136_1A and PE device 122-2A, and/or through CE device 136_2A and PE device 122_3A on its way to receiver 112A.

Turning back to FIG. 2, to create a loop-free forwarding path from source 132A to receiver 112A, a multicast distribution tree may be established between source 132A to receiver 112A using reverse-path forwarding (RPF). In RPF, router forwarding tables may be organized based on the reverse path from the receiver back to the source of the multicast. A multicast distribution tree represents connectivity or a path between a receiver and the multicast source, which is analogous to a tree like formation where a source or rendezvous point (RP) is the root and receivers are the leaves. Multicast distribution trees may be identified by a combination of a source address (S) and a multicast group address (G), represented as "(S, G)." Here, the source address (S) is the address of source 132A.

The source address (S) may be a wild card (*) to denote all source addresses, represented as "(*, G)." There may be multiple sources for a multicast group and the wildcard indicates the receiver wants multicast data from all of them. Instead of looking up the source address (S) of source 132A, an address of a rendezvous point (RP) associated with the multicast group address (G) is looked up. An RP is a meeting point for the multiple sources. The multiple sources send multicast data packets/traffic to the RP and the RP forwards the multicast data packets/traffic to receiver 112A through PE devices 122_2A and 122_3A. For the situation where the receiver requests multiple sources, the PIM join messages specify (*, G) and the RP may be represented by source 132A.

Receiver 112A may look up the path to source 132A, determine that the path goes through neighbor CE device 116A, and send a PIM join message a multicast group CE device 116A (210). A PIM join message may be a request to join a multicast group. FIG. 5B shows example PIM join message fields 500B according to some embodiments. CE device 116A may receive the request message, add an (S, G) entry in its own multicast routing table, look up the path to source 132A, determine the path goes through PE device 122_1A, and send a PIM join message to PE device 122_1A (220). PE device 122_1A may receive the PIM join message, add an (S, G) entry in its own multicast routing table, look up the path to source 132A, and determine the path goes through PE devices 122_2 and 122_3A.

To transit over the EVPN network, the PIM join message is converted/translated to a selective multicast ethernet tag (SMET) message. PE device 122_1A may send the SMET message to EVPN network PE devices 122_2A and 122_3A through EVPN 124 (230A and 230B). Typically, only one PE device—referred to as the PIM EVPN gateway (PEG) designated router (DR)—may join a source outside of its customer network (external network). Thus, only the PEG DR may convert an SMET message to a PIM join message. Here, PE device 122_1A may be the PEG DR.

PE devices 122_2A and 122_3A may receive the SMET message, convert/translate the SMET message to a PIM join message, and add an (S, G) entry in their own multicast routing table. PE device 122_2A may lookup the path to source 132A, determine that the path goes through neighbor CE device 136_1A, and send a PIM join message to CE device 136_1A (240A). In addition, PE device 122_3A may lookup the path to source 132A, determine that the path goes through neighbor CE device 136_2A, and send a PIM join message to CE device 136_2A (240B).

Figure 3:
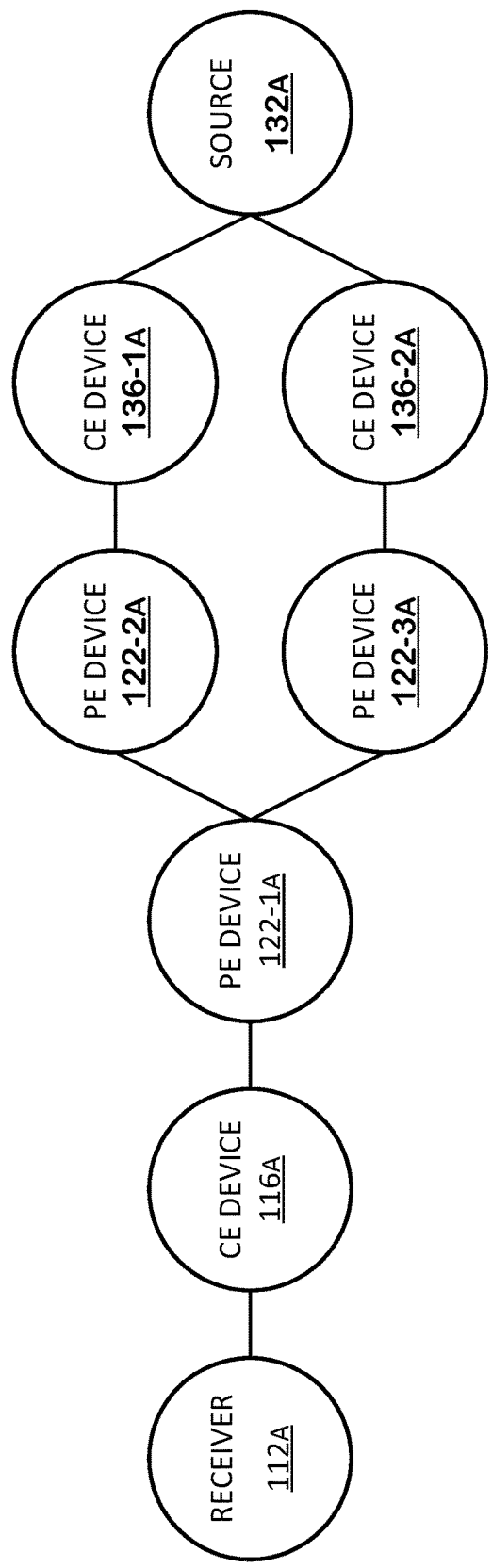
FIG. 3 illustrates multicast distribution trees in accordance with some embodiments.

CE devices 136_1A and 136_2A may each receive a PIM join message and add an (S, G) entry in their own multicast routing table. The multicast distribution tree has now been established. FIG. 3 depicts multicast distribution tree 300 which may result from the example of FIG. 2, in accordance with various embodiments.

Both PE devices 122_2A and 122_3A are a part of the multicast distribution tree from source 132A to receiver 112A. PE devices 122_2A and 122_3A may send the same data packets from source 132A through the EVPN network to PE device 122_1A. The resulting duplicate/redundant multicast data packets/traffic—in the example of FIG. 2, twice as many packets as needed are transmitted—is inefficient and hence undesirable.

To eliminate the duplicate/redundant multicast data packets/traffic, one of PE devices 122_2 and 122_3 may be designated to be in the multicast distribution tree and the other PE device(s) not to be in the multicast distribution tree. In other words, just one of PE devices 122_2 and 122_3 may forward the multicast data packets/traffic from source 132A to receiver 112A. The other PE device may not forward the multicast data packets/traffic from source 132A to receiver 112A. The PE device that forwards the multicast data packets/traffic may be referred to as a PEG DR.

The PEG DR may be determined using an election. For example, the PEG DR may be elected based on having a highest (or lowest) router identification, such as an IP address. The election process may be deterministic, such that each of the PE devices determines the PEG DR and arrives at the same result. Suppose PE device 122_2A is the PEG DR. PE device 122_2A may join source 132A and forward multicast data packets/traffic to receiver 112A.

A problem may arise, in the above example, when PE device 122_2A loses connectivity to source 132A (e.g., PE device 122_2A and/or CE device 136_1A become inoperative). In this situation, multicast data packets/traffic from source 132A may be lost, which is also undesirable.

Consider another PE device which is elected as the PEG DR, but is not a part of the customer network (PIM domain) with source 132A. In other words, the PEG DR (e.g., PE 122-1A) does not have a path to the source (e.g., source 132A). PE devices 122_2A and 122_3A may not be allowed to convert the SMET message into PIM join messages and source 132A may not be joined. Although PE devices 122_2A and 122_3A do have a path to source 132A, they are not allowed to join, because they are not the PEG DR.

Using PIM Over EVPN Networks

Referring back to FIG. 1, PE devices 122_2 and 122_3 typically do not exchange PIM messages through EVPN 124 and accordingly do not employ PIM mechanisms with each other. EVPN was designed to replace connectionless protocols, such as PIM. A connectionless protocol refers to communication between two network endpoints without a prior arrangement and in which one network endpoint simply sends a message to the other. Accordingly, PIM is generally not used across an EVPN. Although EVPN offers some facilities, such as selective multicast Ethernet tags (SMETs), EVPN lacks functions offered by PIM. As described below, PIM mechanisms may be used to select an initial assert winner to eliminate redundant traffic and select a next assert winner when the initial assert winner loses connectivity to a source for reliability.

Figure 4:
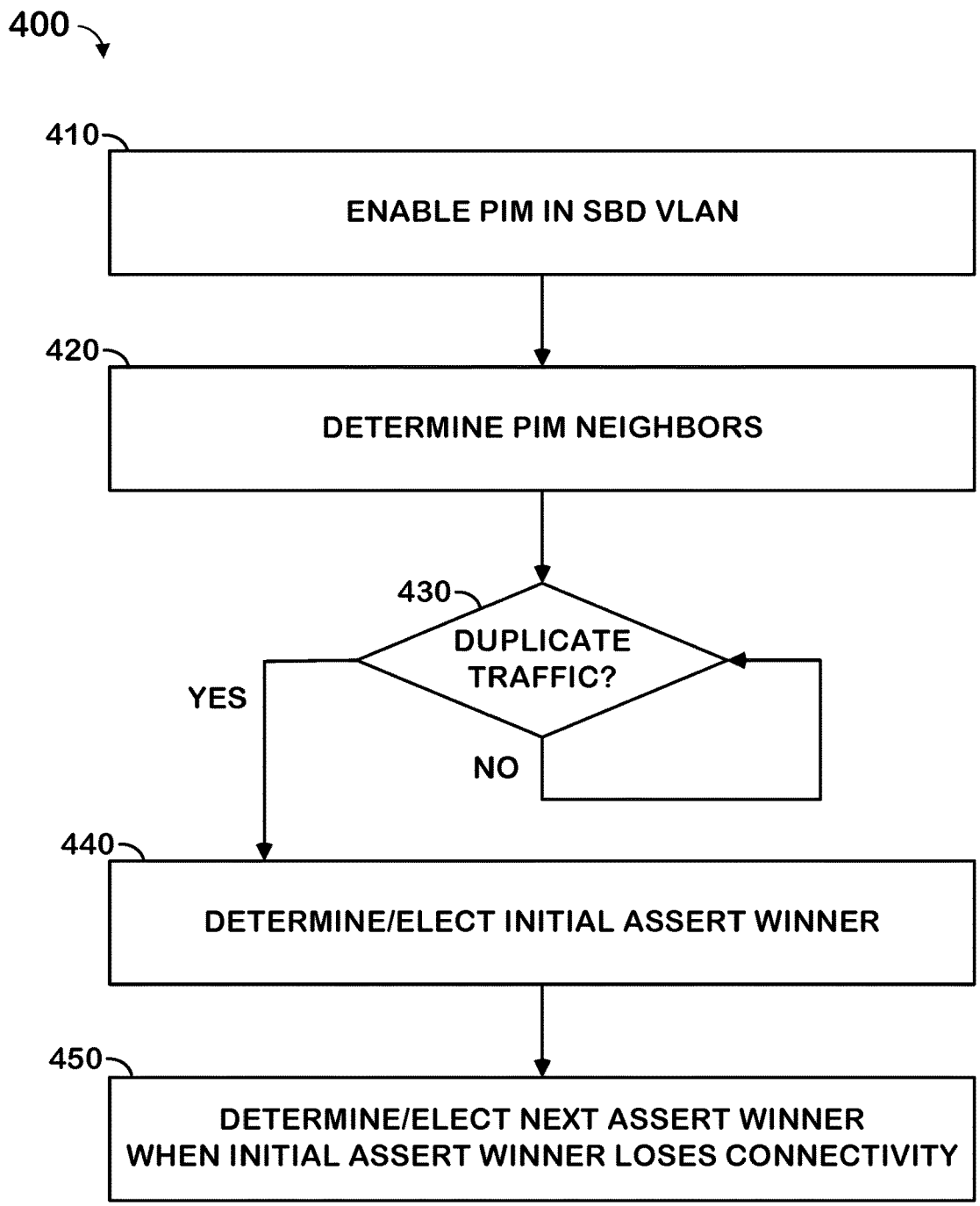
FIG. 4 illustrates a flow diagram in accordance with various embodiments.

FIG. 4 shows a method 400 for selecting an assert winner according to some embodiments. Method 400 is described with reference to FIG. 1. Method 400 may be performed by one or more of PE devices 122_1 through 122_3 (FIG. 1). Steps of method 400 may be performed before, concurrently with, after, and instead of one or more steps of communication flow diagram 200 (FIG. 2).

Method 400 may commence with enabling PIM in PE devices 122_1 through 122_3 (and hence across EVPN 124) (410). PE devices 122_1 through 122_3 may be assigned to a supplemental bridge domain (SBD). A virtual routing and forwarding (VRF) domain may be uniquely mapped to the one or more SBDs. The SBD may include a logical interface provided by the PE devices that enables bidirectional flow of (layer 3) data traffic for a tenant through EVPN 124 (a layer 2 bridged network). The SBD may be a virtual LAN (VLAN) between PE devices 122_1 through 122_3 associated with the mapped VRF domain, which may be referred to as an SBD VLAN. PIM may be enabled on an SBD logical interface in PE devices 122_1 through 122_3. Typically, PE devices (e.g., PE devices 122_1 through 122_3) have a layer 3 interface for each VLAN. Here, the SBD logical interface may be a layer 3 interface associated with the SBD VLAN. In other words, a VLAN terminates at a PE device, so that network traffic received over the VLAN may be forwarded. The layer 3 termination of the VLAN may occur at the SBD logical interface. Implementing/enabling PIM in EVPN 124 includes configuring the PE device as a PIM router at the end of the SBD VLAN. Accordingly, there may be one or many bridge domains (e.g., VLANs) per VRF. The VRF may segment networking paths by enabling multiple instances of a routing table to exist in a virtual router and be used simultaneously.

Once PIM is enabled in PE devices 122_1 through 122_3 (and hence across EVPN 124), PE devices 122_1 through 122_3 may exchange PIM messages and utilize PIM facilities. PE devices 122_1 through 122_3 may convert PIM messages to selective multicast ethernet tag (SMET) messages when exchanging them with each other over EVPN 124. In communication flow diagram 200, for example, a PIM join message is converted/translated to a SMET message (230A and 230B). PE devices 122_1 through 122_3 may translate the SMET messages (240A and 240B) back to PIM join messages. In contrast to the case with a PEG DR, the PE devices that are not the PEG DR (e.g., lost the election) may be allowed to translate SMET messages to PIM join messages. Some PE devices may not have a path to the source (or rendezvous point), so those PE devices may not translate the SMET message. SMET message may be received by (all of) the PE devices in the tenant.

PIM neighbors may be determined (420). For example, one or more of PE devices 122_1 through 122_3 may send PIM hello messages. PIM hello messages may be used for neighbor discovery and neighbor keepalives. PIM hello and assert messages may be encapsulated for EVPN transport (e.g., virtual extensible LAN (VxLAN), multi-protocol label switching (MPLS), generic routing encapsulation (GRE), and the like). FIG. 5A depicts example PIM hello message fields 500A-1 according to various embodiments. Option Types and Option Values 500A-2 may be examples for Option Types and Option Values in example PIM hello message fields 500A-1. Combinations/permutations of PE devices 122_1 through 122_3 may become neighbors when they receive each other's PIM hello messages.

Referring to FIG. 2, 122-1A may send SMET 230A and 230B to 122-2A and 122-3A. SMET 230A and 230B may be translated to PIM join messages, which attracts traffic from source 132A to the EVPN domain (e.g., EVPN 124). In other words, data traffic may flow from source 132A.

Turning back to FIG. 4, one or more of PE devices 122_1 through 122_3 may detect duplicate network traffic (430). When duplicate traffic is not detected, method 400 may repeat step 430 (or end). For example, this may occur when only one PE device has a path to the source. When duplicate traffic is detected, method 400 may proceed to step 440. Duplicate traffic may be detected by a PE device (e.g., PE devices 122_1 through 122_3) when the PE device determines network traffic (e.g., data packets) it sends out to the SBD VLAN (e.g., on one interface) is the same (e.g., the packets have the same source) as network traffic received from the SBD VLAN (e.g., on another interface). For example, the PE device may have reverse-path forwarding (RPF) functions which may be used to detect duplicate traffic.

An initial assert winner may be determined (440). An assert winner may be elected when there are PE devices that forward the same multicast data packets/traffic to a receiver (s) (e.g., duplicate traffic). For example, when PE device 122_2 and PE device 122_3 both forward multicast packets to receiver 112, PE device 122_2 and PE device 122_3 will see each other's multicast data packets/traffic, triggering the PIM assert mechanism. The PIM assert mechanism selects/elects one of the PE devices to be the assert winner. The assert winner may forward the multicast traffic to the receiver; the PE devices that are not the assert winner may not forward (e.g., drop) the multicast traffic to the receiver and may stop translating SMET messages into PIM join messages.

PIM assert messages may be used to elect the assert winner. FIG. 5C depicts example PIM assert message fields 500C in accordance with some embodiments. Group Address may be the multicast IP destination address of the packet that triggered the Assert. Source Address may be the IP source address of the multicast packet that triggered the Assert. Metric Preference may be a preference value assigned to the unicast routing protocol that provided the route to the source. Metric Preference may be used in the same way an administrative distance is used, namely to provide a consistent metric when comparing routes from diverse routing protocols. Metric Preference may be a metric associated with the route to source 132 in the sender's unicast routing table.

Turning back to FIG. 4, suppose there are four PE devices, PE-A, PE-B, PE-C, and PE-D. One (or more) of the PE devices, for example PE-A, may detect duplicate traffic from the other PE devices and send/broadcast a PIM assert message with a value(s) for a metric(s). The other PE devices, PE-B, PE-C, and PE-D, may receive the PIM assert message from PE-A. The other PE devices may compare the received value for the metric against their own value for the metric. When one of the other PE devices, for example PE-B, has a worse value for the metric, that PE device may not send a PIM message responsive to the received PIM assert message.

When the other PE devices, for example PE-C and PE-D, have better values for the metric than the received value, they may send PIM assert messages with their value for the metric. PIM assert message may be sent in this way until the other PE devices do not have a better value for the metric. Tie breaking mechanisms may also be used. In absence of receiving a PIM assert message with a value for the metric from another PE device and after determining that its metric value is better than one or more metric values already received in PIM assert messages, the PE device that sent (the last) PIM assert message with its value for the metric will determine it is the assert winner. Here, PE-A and PE-B have worse values for the metric and do not respond to the PIM assert messages from PE-C and PE-D. PE-C and PE-D may compare their respective value for the metric against the other's value for the metric. Suppose PE-D has a better value for the metric than PE-C. PE-C will not respond to PE-D's PIM assert message. PE-D determined its value for the metric is better than PE-C's value, did not receive another PIM assert message, and determines it is the assert winner.

Administrative distance may be a metric used to determine the assert winner. Administrative distance may define the reliability of a routing protocol. Each routing protocol may be prioritized in order of most to least reliable (believable) with an administrative distance value. Administrative distance may be an arbitrary unit. For example, when the route source is a directly connected interface, the administrative distance may be 0. When the administrative distance is 255, the source of the route may not be trusted.

When administrative distances are equal (e.g., for tie breaking), the unicast routing metric towards the source of PE device 122_2 and PE device 122_3 may be compared. For example, the unicast routing metric may be a hop count and the minimum number of hops wins the election. Alternatively or when the unicast routing metrics are equal, the PE device with the highest IP address may win the election. The unicast routing metric and IP addresses may be sent by a PE device in a PIM assert message.

Suppose PE device 122_2 is elected assert winner. PE device 122_3 may prune the SBD from its VRF list, so as not to (redundantly) forward the multicast data packets.

The other PE devices may subsequently determine that the initial assert winner lost its connection to source 132 and elect another assert winner (450). Suppose PE device 122_2 was elected assert winner and subsequently loses its connection to source 132. For example, PE device 122_2 and PE device 122_3 may periodically exchange PIM hello messages. When PE device 122_3 determines that PE device 122_2 is down based on one or more PIM hello messages, the PIM assert mechanism may be triggered and the next assert winner elected, such as for the election described above.

In contrast to predesignating one PIM EVPN gateway (PEG) designated router (DR) for all flows to join a source outside of its customer network, dynamically selecting an assert winner per flow as described above advantageously results in optimal traffic flow from the source. Conventionally, the PEG DR may not have a path to the source, whereas the dynamically elected assert winner does have a path to the source. Moreover, method 400 may detect duplicate network traffic and stop it. In addition, selecting the assert winner is not limited by how the multicast network is structured.

In further contrast to predesignating one PEG DR, when the elected PE device loses connectivity to the source, persistent traffic loss may result. Here, another PE device that has a path to the source may advantageously be automatically elected, resulting in a quick recovery (e.g., on the order of seconds) and reducing traffic loss.

Computer System

Figure 6:
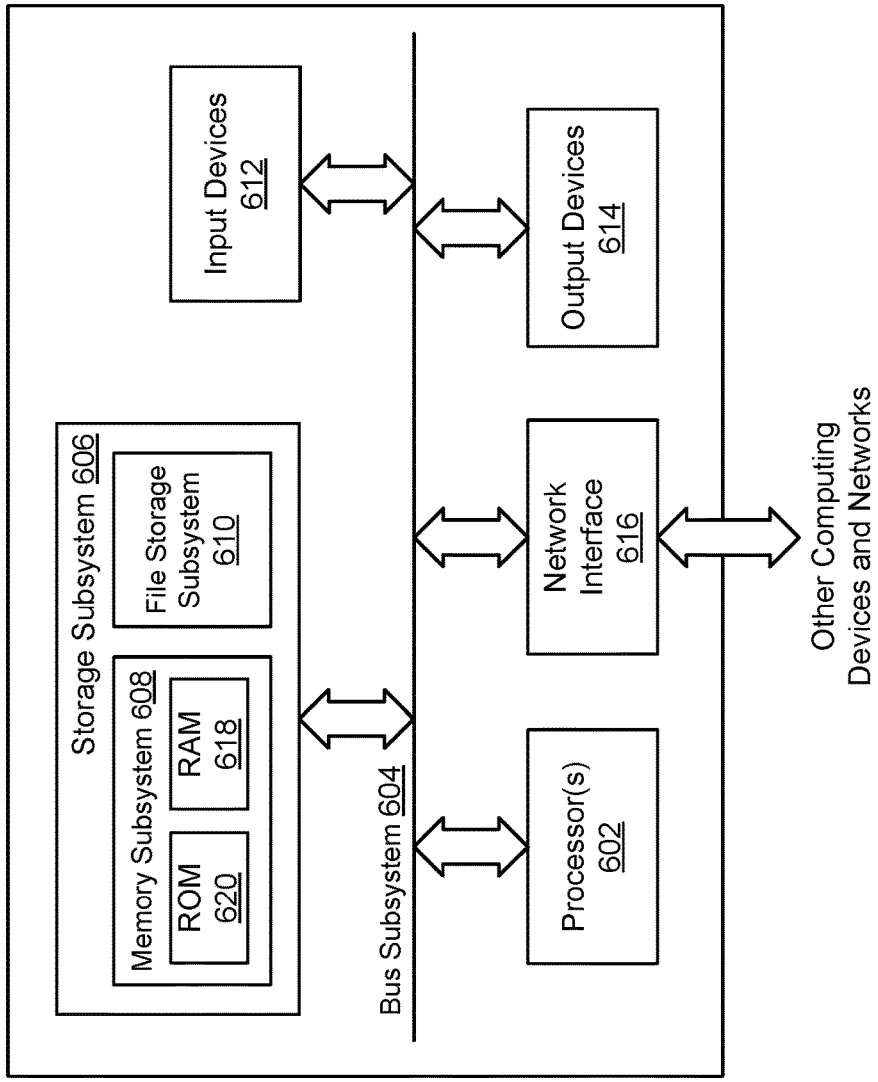
FIG. 6 illustrates an illustrative example of a computer device in accordance with various embodiments.

FIG. 6 depicts a simplified block diagram of an example computer system 600 according to certain embodiments. Computer system 600 can be used to implement receivers 112 and 112A, and sources 132 and 136A (FIGS. 1 and 2). As shown in FIG. 6, computer system 600 includes one or more processors 602 that communicate with a number of peripheral devices via bus subsystem 604. These peripheral devices include storage subsystem 606 (comprising memory subsystem 608 and file storage subsystem 610), user interface input devices 612, user interface output devices 614, and network interface subsystem 616.

Bus subsystem 604 can provide a mechanism for letting the various components and subsystems of computer system 600 communicate with each other as intended. Although bus subsystem 604 is shown schematically as a single bus, alternative embodiments of the bus subsystem can utilize multiple busses.

Network interface subsystem 616 can serve as an interface for communicating data between computer system 600 and other computer systems or networks. Embodiments of network interface subsystem 616 can include, e.g., an Ethernet card, a Wi-Fi and/or cellular adapter, a modem (telephone, satellite, cable, ISDN, etc.), digital subscriber line (DSL) units, and/or the like.

User interface input devices 612 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 600.

User interface output devices 614 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 600.

Memory subsystem 606 includes memory subsystem 608 and file/disk storage subsystem 610 represent non-transitory computer-readable storage media that can store program code and/or data, which when executed by processor 602, can cause processor 602 to perform operations in accordance with embodiments of the present disclosure.

Memory subsystem 608 includes a number of memories including main random access memory (RAM) 618 for storage of instructions and data during program execution and read-only memory (ROM) 620 in which fixed instructions are stored. File storage subsystem 610 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 600 is illustrative and many other configurations having more or fewer components than system 600 are possible.

Network Device

Figure 7:
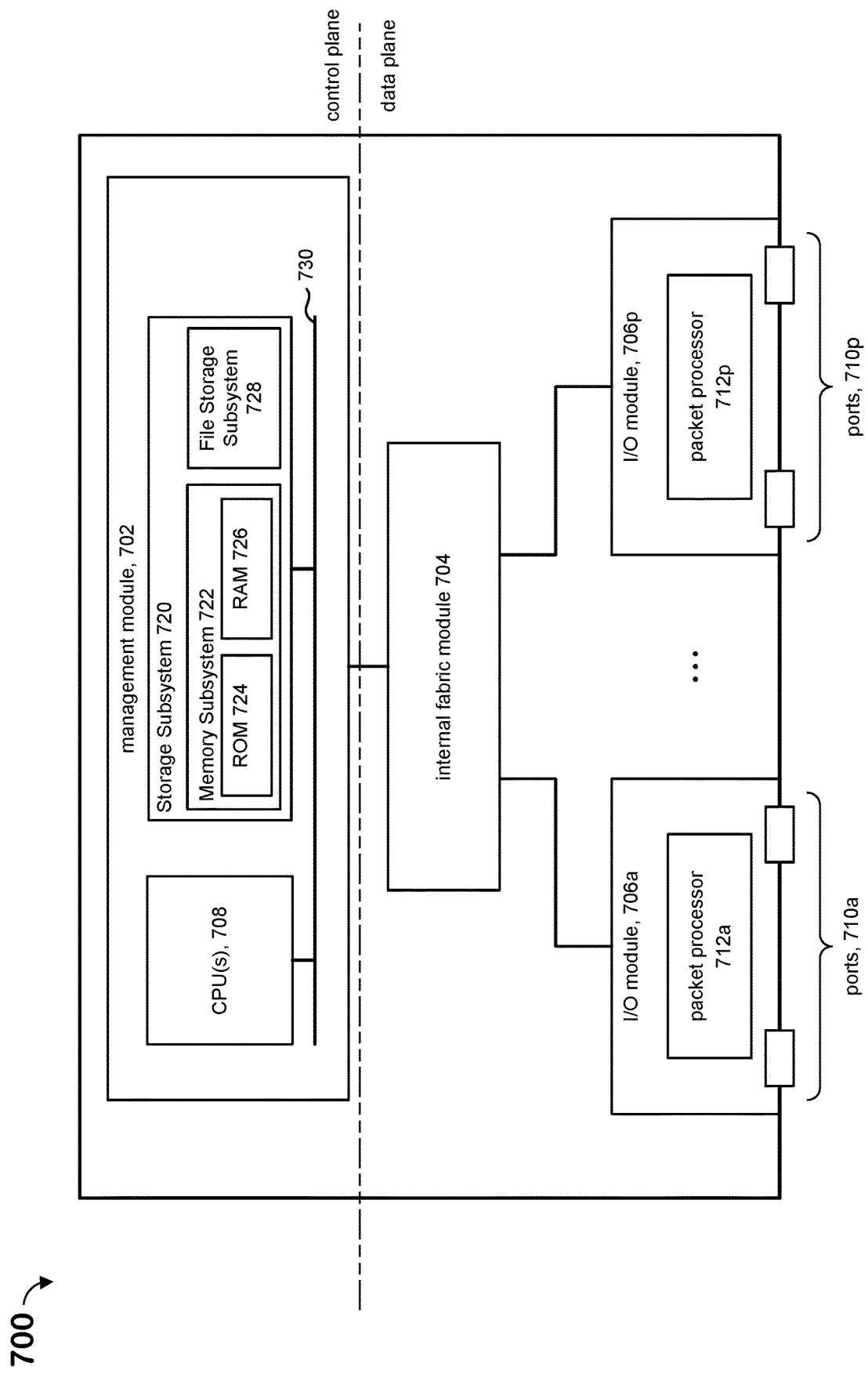
FIG. 7 shows an illustrative example of a networking device that can be adapted according to some embodiments.

FIG. 7 depicts an example network device 700 in accordance with some embodiments of the present disclosure. In some embodiments, network device 700 can be a switch or router, such as CE devices 116, 136_1 and 136_2; CE devices 116A, 136_1A and 136_2A; PE devices 122_1, 122_2, and 122_3; and PE devices 122_1A, 122_2A, and 122_3A (FIGS. 1 and 2). As shown, network device 700 includes a management module 702, an internal fabric module 704, and a number of I/O modules 706a-706p. Management module 702 includes the control plane (also referred to as control layer or simply the CPU) of network device 700 and can include one or more management CPUs 708 for managing and controlling operation of network device 700 in accordance with the present disclosure. Each management CPU 708 can be a general-purpose processor, such as an Intel®/AMD® x86 or ARM® microprocessor, that operates under the control of software stored in a memory, such as random-access memory (RAM) 726. Control plane refers to all the functions and processes that determine which path to use, such a routing protocols, spanning tree, and the like.

Internal fabric module 704 and I/O modules 706a-706p collectively represent the data plane of network device 700 (also referred to as data layer, forwarding plane, etc.). Internal fabric module 704 is configured to interconnect the various other modules of networking device 700. Each I/O module 706a-706p includes one or more input/output ports 710a-710p that are used by network device 700 to send and receive network packets. Input/output ports 710a-710p are also known as ingress/egress ports. Each I/O module 706a-706p can also include a packet processor 712a-712p. Each packet processor 712a-712p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 702 includes one or more management CPUs 708 that communicate with storage subsystem 720 via bus subsystem 730. Other subsystems, such as a network interface subsystem (not shown in FIG. 7), may be on bus subsystem 730. Storage subsystem 720 includes memory subsystem 722 and file/disk storage subsystem 728 represent non-transitory computer-readable storage media that can store program code and/or data, which when executed by one or more management CPUs 708, can cause one or more management CPUs 708 to perform operations in accordance with embodiments of the present disclosure.

Memory subsystem 722 includes a number of memories including main RAM 726 for storage of instructions and data during program execution and read-only memory (ROM) 724 in which instructions and data are stored in a non-volatile medium. File storage subsystem 728 can provide persistent (i.e., non-volatile) storage media for program and data files, and can include a magnetic or solid-state hard disk drive, CD-ROM, Blu-ray Disc, USB flash drive, and/or other types of storage media known in the art.

One or more management CPUs 708 can run a network operating system stored in storage subsystem 720. A network operating system is a specialized operating system for network device 700 (e.g., a router, switch, firewall, and the like). For example, the network operating system may be Arista Extensible Operating System (EOS®), which is a fully programmable and highly modular, Linux-based network operating system. Other network operating systems may be used.

Bus subsystem 730 can provide a mechanism for letting the various components and subsystems of management module 702 communicate with each other as intended. Although bus subsystem 730 is shown schematically as a single bus, alternative embodiments of the bus subsystem can utilize multiple busses.

What is claimed is:

1. A method for forwarding multicast traffic in a network, said network comprising a first provider edge (PE) device, a second PE device and a third PE device, wherein protocol independent multicast (PIM) is enabled on supplemental bridge domain (SBD) logical interfaces of the first PE device, the second PE device, and the third PE device, and wherein the first PE device, the second PE device, and the third PE device communicate with each other and with a receiver using a PIM protocol through an Ethernet virtual private network (EVPN), the method comprising:
- the second PE device receiving a SMET message from the first PE device, wherein the SMET message is converted from a PIM join message by the first PE device,
- wherein the second PE device and the third PE device are configured to forward multicast data packets from a source in a first customer network to the receiver in a second customer network;
- the second PE device detecting duplicate traffic when the third PE device is forwarding the multicast data packets;
- upon the second PE device determining the third PE device is an assert winner from among the second PE device and the third PE device based on at least one PIM assert message, the third PE device is configured to continue to forward the multicast data packets;
- the second PE device ceasing to forward the multicast data packets based on the determining;
- detecting the third PE device stopped forwarding the multicast data packets based on PIM hello messages;
- determining the second PE device is a next assert winner; and
- the second PE device resuming forwarding the multicast data packets based on the determining the second PE device is the next assert winner.

2. The method of claim 1, wherein the assert winner is determined based on one or more of respective administrative distances and addresses of the second PE device and the third PE device.

3. The method of claim 1, wherein the second PE device and the third PE device are PIM neighbors based on PIM hello messages.

4. The method of claim 1, wherein the EVPN is in a provider core network.

5. The method of claim 1, wherein the source is a PIM rendezvous point.

6. The method of claim 1, wherein a virtual routing and forwarding (VRF) domain is mapped to the SBD.

7. A network device system comprising:
- at least one processor; and
- at least one memory communicatively coupled to the at least one processor, the at least one memory storing a program executable by the at least one processor to perform a method for forwarding multicast traffic in a network, said network comprising a first network device, a second network device and a third network device, wherein protocol independent multicast (PIM) is enabled on supplemental bridge domain (SBD) logical interfaces of the first network device, the second network device, and the third network device, and wherein the first network device, the second network device, and the third network device communicate with each other and with a receiver using a PIM protocol through an Ethernet virtual private network (EVPN), the method comprising:
- the second network device receiving a SMET message from the first network device, wherein the SMET message is converted from a PIM join message by the first network device,
- the second network device and the third network device are configured to forward multicast data packets from a source to the receiver;
- the second network device detecting duplicate traffic when the third network-device is forwarding the multicast data packets;
- upon the second network device determining the second network device is an assert winner from among the second network device and the third network device based on at least one PIM assert message, the third network device is configured to cease to forward the multicast data packets;
- the second network device continuing to forward the multicast data packets based on the determining;
- when the second network device stops forwarding the multicast data packets based on PIM hello messages, the third network device is determined to be a next assert winner; and
- the third network device is configured to forward the multicast data packets based on the determining that the third network device is the next assert winner.

8. The network device system of claim 7, wherein the source is a server and the receiver is at least one of a smart phone, tablet computer, notebook computer, desktop computer, (smart) television, and smart speaker.

9. The network device system of claim 7, wherein the forwarding multicast data packets from the source to the receiver is based on a multicast distribution tree, the multicast distribution tree being constructed using PIM join messages.

10. The network device system of claim 7, wherein the second network device and the third network device are in a provider core network.

11. The network device system of claim 7, wherein the source is a rendezvous point.

12. The network device system of claim 7, wherein the assert winner is determined based on respective administrative distances of the second network device and the third network device.

13. A computer-readable, non-transitory storage medium having a program stored thereon, the program being executable by a processor to perform a method for forwarding multicast traffic in a network device system in a provider core network, said network device system comprising a first network device, a second network device and a third network device, wherein protocol independent multicast (PIM) is enabled on supplemental bridge domain (SBD) logical interfaces of the first network device, the second network device, and the third network device, and wherein the first network device, the second network device, and the third network device communicate with each other and with a receiver using a PIM protocol through an Ethernet virtual private network (EVPN), the method comprising:
- the second network device receiving a SMET message from the first network device, wherein the SMET message is converted from a PIM join message by the first network device,
- the second network device and the third network device are configured to forward first multicast traffic;
- the second network device detecting second multicast traffic in the provider core network is a duplicate of the first multicast traffic, the first multicast traffic and the second multicast traffic being from a source in a first customer network and to the receiver in a second customer network;
- wherein PIM messages are received and sent by the second network device, said PIM messages including a metric in the provider core network through the EVPN;
- determining the second network device is an assert winner from the second network device and the third network device based on the metric, wherein the third network device is configured to drop subsequent second multicast traffic based on the determining;

the second network device forwarding subsequent first multicast traffic based on the determining;

the second network device stops forwarding the first multicast traffic based on PIM hello messages; and upon determining the third network device is a next assert winner, the third network device is configured to forward the second multicast traffic.

14. The computer-readable, non-transitory storage medium of claim 13, wherein the metric is an administrative distance.

15. The computer-readable, non-transitory storage medium of claim 13, wherein each SBD is uniquely mapped to a virtual routing and forwarding (VRF) domain.

16. The computer-readable, non-transitory storage medium of claim 13, wherein the SBD is removed from VRF lists based on the determining.

17. The computer-readable, non-transitory storage medium of claim 13, wherein forwarding the first multicast traffic and the second multicast traffic is based on a multicast distribution tree constructed using PIM join messages.

* * * * *